April 27, 1965 P. MESHBERG 3,180,536
SELECTIVE DISPENSING MEANS
Filed April 8, 1963 2 Sheets-Sheet 2
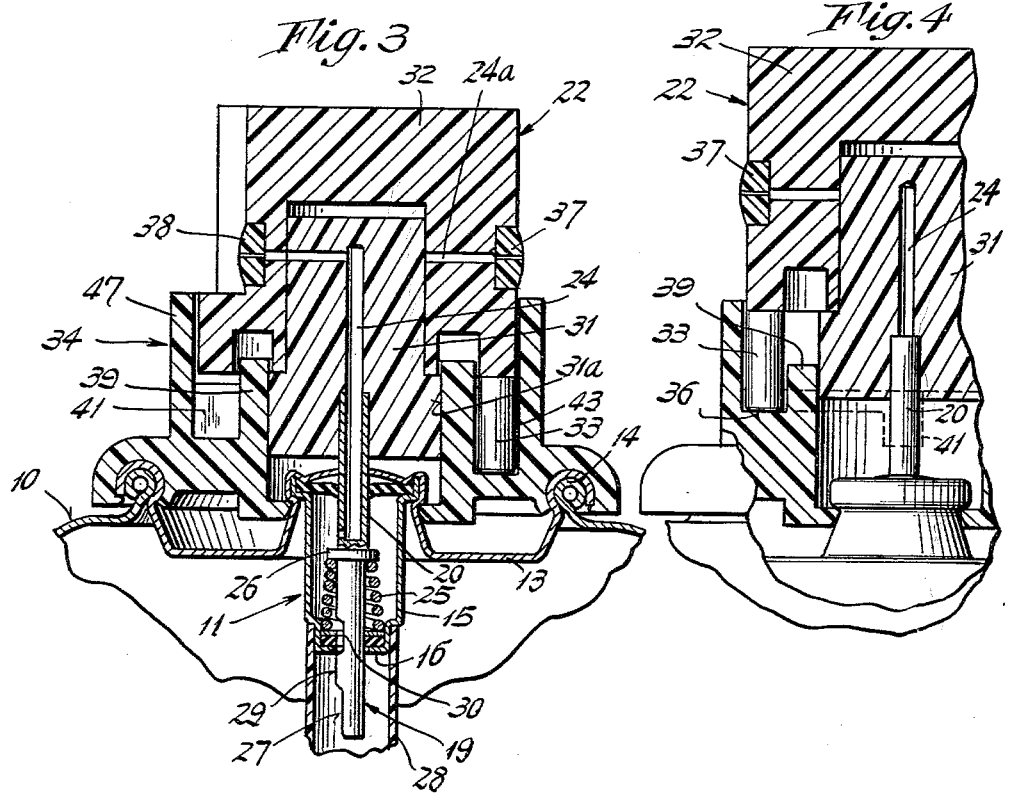
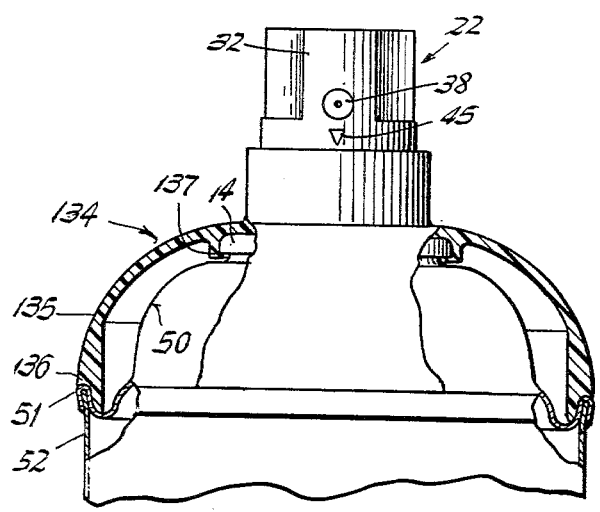
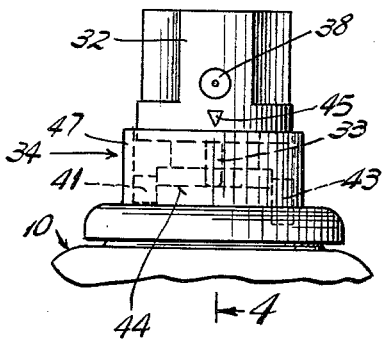
INVENTOR.
Philip Meshberg
BY
Johnson and Kline
ATTORNEYS

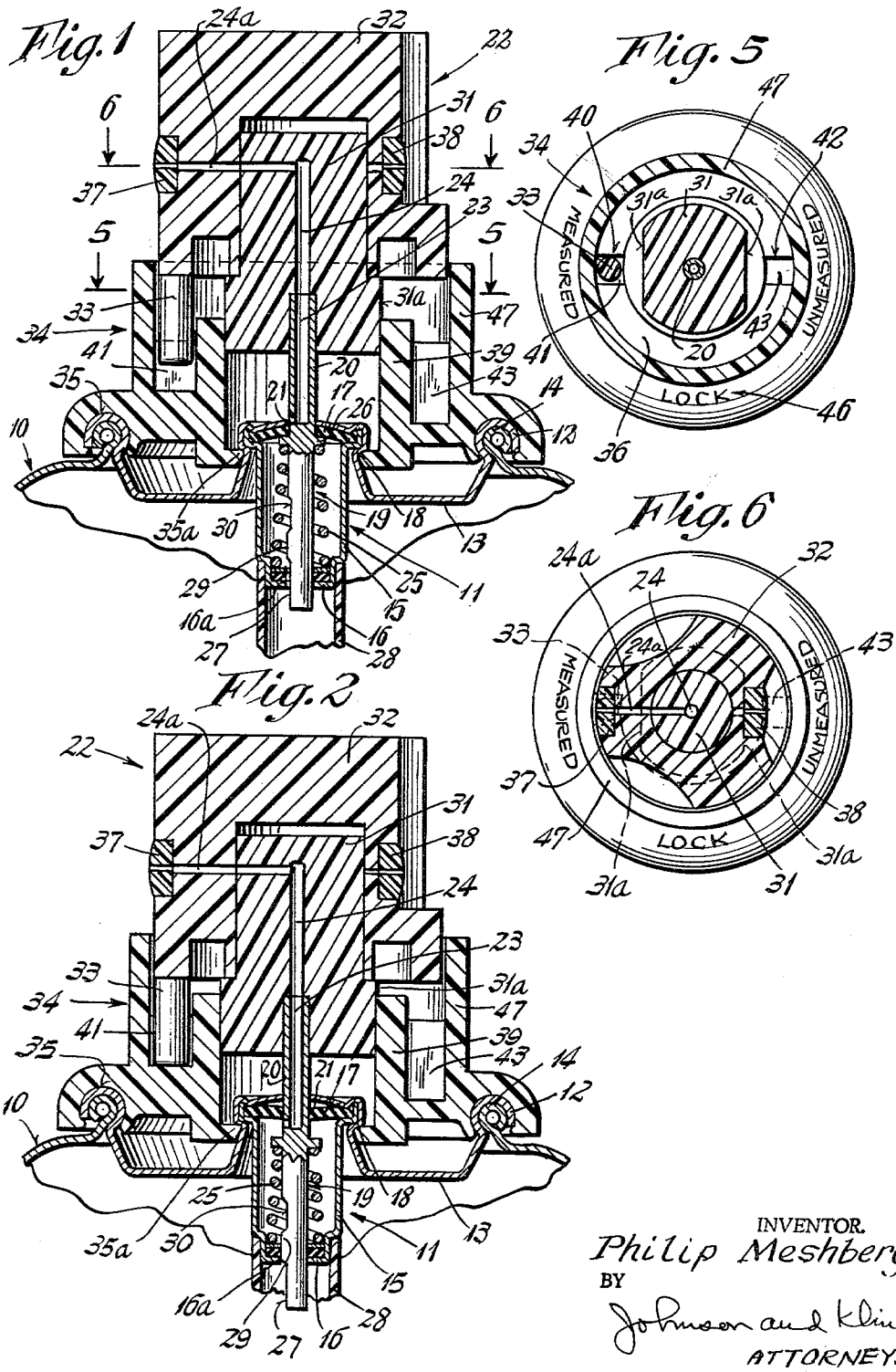

United States Patent Office 3,180,536
Patented Apr. 27, 1965

3,180,536
SELECTIVE DISPENSING MEANS
Philip Meshberg, 290 Euclid Ave., Fairfield, Conn.
Filed Apr. 8, 1963, Ser. No. 271,404
11 Claims. (Cl. 222—394)

The present invention relates to a novel device and particularly to valve means for selectively dispensing material from a container, having an internal pressure, either continuously or in metered quantities.

Heretofore, valve means have been provided whereby material was dispensed continuously from aerosol containers. While this provided large quantities of material, with some materials his became wasteful and valve means were provided to dispense the materials in metered quantities in order to control the amount of material being dispensed. However, when substantial quantities of the material were required, it became necessary, because of the nature of the metering valve, to operate the valve a plurality of times in order to obtain the necessary quantity. At no time, however, could the user have the advantages of the two dispensing means using the same valve means.

The present invention overcomes this difficulty by providing a novel valve construction wherein a single valve means, by being moved to predetermined different positions, can selectively dispense the material from the container continuously or in metered amounts.

This is accomplished by providing means for normally metering a predetermined quantity of material from the container and also providing a bypass means for the metering means whereby the metering action can be eliminated and continuous dispensing achieved.

In the herein illustrated form of the invention, a reciprocating valve stem is employed having means thereon for sealing a measuring chamber from the container prior to the opening of the dispensing passage to dispense the material from the chamber whereby a metered charge is dispensed for each operation of the valve, and the valve stem is provided with a bypass means which, when moved to a predetermined different position, will bypass the metering means. Preferably, the aerosol device is provided with control means for controlling the movement of the stem to either position so that accurate operation of the device for each type of dispensing can be achieved. Also, if desired, the control means can be provided with means for blocking the movement of the valve stem in its nondispensing position so that inadvertent discharge of the material from the container is avoided.

Furthermore, if desired, a plurality of dispensing nozzles can be employed and the control device associated with the valve so that when one of the dispensing nozzles is in a predetermined dispensing position, the device will deliver metered amounts, and when the other dispensing nozzle is in dispensing position, the device will dispense continuously the material from the container. The nozzles can, if desired, provide different spray patterns so that a single valve means can meet several needs.

Other features and advantages of the invention will be apparent from the specification and claims when considered in connection with the accompanying drawings in which:

FIGURE 1 shows a sectional view of the valve means of the present invention with the dispensing button in position to dispense a measured charge therefrom.

FIG. 2 shows the button moved to dispensing position.

FIG. 3 shows the dispensing button in position to dispense material from the container.

FIG. 4 is a sectional view taken along line 4—4 of FIG. 7 showing the dispensing button in blocked relation.

FIG. 5 is a sectional view taken along line 5—5 of FIG. 1.

FIG. 6 is a sectional view taken along line 6—6 of FIG. 1.

FIG. 7 is a side view showing the dispensing means in blocked position.

FIG. 8 is a view showing another type of mounting means for the control member.

As shown in the drawings, an aerosol container 10 for the usual aerosol material has a valve means 11 secured thereto by having the flange 12 of the mounting means 13 rolled into sealing relation with the bead 14 around the mouth of the container with the valve means in position to dispense aerosol material therefrom. The term "aerosol material" as used herein denotes a material to be dispensed from a container having an internal pressure, preferably a gaseous pressure, to form a mist, spray or stream of liquid or semi-solid material.

The valve means comprises a housing 15 having one end closed by an inner wall 16 having an aperture 16a and the other end closed by a sealing disk or washer 17 so as to form the measuring chamber. The housing and disk are secured to the mounting means 13 by the crimped portion 18. A reciprocating valve stem 19 has a portion 20 passing through an aperture 21 in the sealing disk 17 and projecting from the container and has a dispensing button 22 thereon. The portion 20 has a passage 23 adapted to be moved into the housing to connect the housing to the dispensing passage 24 in the button.

The stem is normally urged to an outward position, as shown in FIG. 1, by the spring 25 and is provided with an abutment 26 engaging the sealing disk 17 to prevent passage of material from the container. The stem is provided with a passage 27 at the inner end normally disposed in the aperture 16a so that material from the container can pass through the dip tube 28 and into the measuring chamber. The stem has a sealing portion 29 which, when the stem is moved to the position of FIG. 2, closes the aperture and seals the housing from the container. The portion 29 is so arranged and located on the stem that it seals the housing just prior to the movement of the passage 23 into the housing so that only the measured quantity of material will be dispensed therefrom.

The stem has formed thereon a bypass portion 30 which, when the stem is moved further inwardly as shown, in FIG. 3, will be disposed in the aperture 16a in the wall and connect the container to the housing so that the material will be continuously dispensed therefrom through the passage 23 which is in communication with the housing.

While the position of the stem to effect either metered or continuous discharge can be determined visually, it is at present preferred to provide means for selectively controlling the movement of the stem to either of said positions. This is accomplished by using a two-part dispensing button, one part of which rotates thereon so as to cooperate with a control means for limiting the inward movement of the stem in the desired position.

In the illustrated form of the invention, the inner part 31 of the button is secured to the stem for movement therewith and the rotating parts 32 is mounted thereon for rotation with respect thereto and has a stop pin 33 thereon for cooperating with a control means 34 carried by the container to control movement of the stem.

The control means in the form shown in FIG. 1 is adapted to be secured to the end of the container so as to surround the valve stem. While it may be connected in many ways, it is herein illustrated as having an annular groove 35 which is adapted to be snapped over the rolled edge of the flange 12 and has an extension 35a adapted to be snapped under the crimped portion 18. The control means has a contoured control track 36 for cooperating with the pin 33 to stop the movement of the stem in various inward positions.

While the rotatable member can be a ring or the like carrying the stop pin, it is at present preferred to form it as a cap having a pair of nozzles 37, 38 in spaced relation and which are rotatable with respect to the inner part into alignment in a discharge position with the lateral portion 24a of the discharge passage in the button.

To facilitate the turning of the part 32 on part 31, the control means has an inner out-of-round collar 39 (FIGS. 1 and 5) cooperating with an out-of-round portion 31a on the button part 31 which hold the button and stem against rotation while permitting longitudinal movement of the stem and button during reciprocation of the stem of the valve means. When the button is turned to the position of FIG. 1, the stop pin will engage a shoulder 40 formed at one end of the control track and will line up the nozzle with the dispensing passage 24a. It will be noted that in this position the stop pin will be located over a shallow recess 41 in the control track as shown in FIG. 1, and when the stem is depressed in the usual manner, the stop pin will go into the recess and engage the bottom thereof as shown in FIG. 2. In this position the stem will be so located, as shown in FIG. 2, that the valve means dispenses only a metered quantity of material.

When the rotatable part of the button is rotated counterclockwise, as shown in FIG. 5, the stop pin will move into engagement with an abutment 42 at the other end of the control track and this will cause nozzle 38 to be aligned with the passage 24a, as shown in FIG. 3, and the stop pin will move over a deeper recess 43 and, when the button is depressed, the valve stem will stop in the position of FIG. 3 wherein the bypass 30 is disposed in the opening 16a in the wall 16 so that the material in the container will be in communication with the passage 24 and a continuous supply of material will be dispensed from the container.

If desired, the two nozzles 37, 38 can have different characteristics. For example, the nozzle 37 can be one which will provide a high dispersion of the material as it is dispensed in a metered quantity, whereas the nozzle 38, for example, can be one which would provide for a greater volume of material to pass therethrough and can provide an entirely different spray pattern.

The control track between the two recesses is, as shown in FIGS. 4 and 7, provided with a level portion 44 which will engage the bottom of the pin 13 when the stem is in its normal outward position and the nozzle is turned to a location out of the dispensing position and prevent inadvertent operation of the button to dispense material from the container.

If desired, indicia can be provided to indicate the settings of the valve means. For example, as shown in FIGS. 5 and 7, the rotatable part 32 can have an arrow 45 cooperating with Lock, Metered, and Unmetered indicia 46 on the control member, as shown in FIG. 5, so that the required action of the valve means can be readily determined.

Thus, it will be seen that the valve means of the present invention, by proper selection, can control the inward movement of the stem so that in one position inadvertent operation of the stem is prevented, and in the second position the stem can move to a point to dispense only metered quantities of material, and in a third position the stem can be operated to only dispense continuously the material in the conatiner.

Since the button will move through a substantially greater distance than in a case where it is operative solely to dispense metered quantities or solely to dispense continuously, the control unit is provided with a circular flange 47 extending upwardly along the outer surface of the control button so as to provide a closure therebetween to prevent foreign material from passing into the control groove so as to interfere with the operation of the button.

If desired, the usual plastic band, not shown, can be disposed around the button and outer flange to prevent tampering with the valve since it will prevent rotation of the outer member out of its blocked position.

In the form of the invention shown in FIG. 8, the control member is mounted on a different type of container in which the end 50 of the can is connected by a rolled bead 51 to the side walls 52 thereof. In this form of the invention the control unit 134 is provided with a mounting dome 135 having its lower ends 136 seated on the rolled bead 51 of the can and having a resilient lip 137 adapted to snap into position under the bead 14 at the mouth of the can. This form of control member can be readily snapped into position providing a simple mounting of the control unit.

Variations and modifications may be made within the scope of the claims and portions of the improvements may be used without others.

I claim:

1. An aerosol device comprising a container containing aerosol material having a propellant for dispensing the material from the container and control valve means thereon movable between a non-dispensing position and a plurality of positions for dispensing material therefrom, the improvement wherein said valve means includes a measuring chamber communicating with the container and a movable stem communicating with a dispensing nozzle and normally located in a non-dispensing position, said stem having means in one dispensing position for sealing off the measuring chamber from communication with the container and dispensing a metered quantity of material and having means in another dispensing position of the stem for connecting the container to the nozzle for continuously dispensing material from the container, and means controlling the movable stem in each of said positions.

2. An aerosol device comprising a container containing aerosol material having a propellant therein for dispensing the material from the container and a valve means thereon movable between a non-dispensing position and a plurality of positions for dispensing material therefrom, said valve means including a housing forming a measuring chamber communicating with the container and a movable stem communicating with a dispensing nozzle, said stem being normally located in a non-dispensing position, said stem having a portion in one dispensing position of the stem cooperating with sealing means on the housing for sealing off the measuring chamber from communication with the container and dispensing a metered quantity of material and having separate means on the stem operable in another dispensing position of the stem for by-passing the sealing means and connecting the container to the nozzle for continuously dispensing material from the container, and means controlling the movable stem in each of said positions.

3. An aerosol device comprising a container containing aerosol material having a propellant therein for dispensing the material from the container and a valve means thereon movable between a non-dispensing position and a plurality of positions for dispensing material therefrom, said valve means including a housing forming a measuring chamber communicating with the container and a reciprocating valve stem communicating with a dispensing nozzle and normally located in a non-dispensing position, said valve stem having adjacent the inner end thereof in one dispensing position of the stem for cooperating with sealing means on the housing for sealing off the measuring chamber from communication with the container and dispensing a metered quantity of material and having a second portion spaced along the stem from said first portion for by-passing the sealing means and connecting the container to the nozzle in another dispensing position of the stem for continuously dispensing material from the container, and means controlling the movable stem in each of said dispensing positions.

4. An aerosol device comprising a container containing aerosol material having a propellant therein for dispensing the material from the container and a valve means thereon movable between a non-dispensing position and a plurality of positions for dispensing material therefrom, the improvement wherein said valve means includes a housing forming a measuring chamber having a port at the inner end communicating with the container, a reciprocating valve stem having a dispensing nozzle on one end and normally located in an outward projected non-dispensing position, said stem having means adjacent the inner other end for normally connecting the chamber to the container through said port and stem having a first portion for sealing off the port of the measuring chamber from communication with the container and connecting the nozzle to the chamber in response to inward movement of the stem to one dispensing position for dispensing a metered quantity of material and having a second portion of the stem spaced from the first portion for connecting the container and chamber to the nozzle for continuously dispensing material from the container in response to further inward movement of the stem to another dispensing position of the stem, and means controlling the movement of the stem in each of said positions.

5. In an aerosol device having valve means for dispensing material therefrom, the improvement wherein said valve means includes a stem having a two-part dispensing button thereon, one of said button parts being secured to the stem to move therewith and having a dispensing passage and the other of said parts having a pair of dispensing nozzles and being rotatable on the first part to bring said nozzles selectively into communication with said dispensing passage in a dispensing position, and means mounted on the device to cooperate with the button to control dispensing of material from the device, said means having a portion engaging the first part of the button to prevent rotation of said part and stem connected thereto and having a separate portion selectively cooperating with the second part of said button to limit the movement of the stem when said nozzles are in dispensing position, said second portion stopping the stem in one position when one nozzle is in dispensing position in which the valve is operative to dispense a metered quantity of material, and stopping the stem in another position when the other nozzle is in dispensing position in which the valve is operative to continuously dispense said material.

6. In an aerosol device having valve means for dispensing material therefrom, the improvement wherein said valve means includes a reciprocating stem having a two-part dispensing button thereon, one of said button parts being secured to the stem to reciprocate therewith and having a dispensing passage and the other of said parts having a pair of spaced dispensing nozzles, each producing a predetermined spray pattern, said second part being rotatable on the first part to bring said nozzles selectively into a dispensing position in alignment with said dispensing passage, and means mounted on the device to cooperate with the button to control dispensing of material from the device, said means having a portion engaging the first part of the button to prevent rotation of said part and stem connected thereto and having a separate portion selectively cooperating with the second part of said button to locate the nozzles in the dispensing position and to limit the inward movement of the stem to one position in which the valve is operative to dispense a metered quantity of material, and in another position in which the valve is operative to continuously dispense said material.

7. In an aerosol device having valve means for dispensing material therefrom, the improvement wherein said valve means includes a reciprocating stem normally urged to an outward non-dispensing location and having a two-part dispensing button thereon, one of said button parts being secured to the stem to reciprocate therewith and the other of said parts being rotatable on the first part, and means on the device cooperating with the first part to prevent rotation of said part and stem connected thereto and having means selectively cooperating with the second part of said button for limiting the inward movement of the stem to various positions, said valve in one position of the stem being inoperative to dispense material from the device, being operative in a second position of the stem to dispense a metered quantity of material, and being operative in a third position to continuously dispense said material.

8. In an aerosol device having valve means for dispensing material therefrom, the improvement wherein said valve means includes a reciprocating stem normally urged to an outward non-dispensing location and having a two-part dispensing button thereon, one of said button parts being secured to the stem to reciprocate therewith and having a dispensing passage and the other of said parts having a pair of dispensing nozzles and being rotatable on the first part to bring said nozzles selectively to a dispensing position and into communication with said dispensing passage, means on the device cooperating with the first part to prevent rotation of said part and stem connected thereto, and means on the device cooperating with the second part of said button for limiting the inward movement of the stem a predetermined amount when one nozzle is in the dispensing position and valve means is operative to dispose a metered quantity of material, and for limiting the inward movement of the stem a different amount when the other nozzle is in the dispensing position and the valve means is operative to continuously dispense said material.

9. A valve means for dispensing material from an aerosol container comprising a housing having an inner end provided with an apertured wall adapted to communicate with said container and a seal for the other end of the housing, a reciprocating stem projecting from the container and a dispensing button provided with a nozzle secured to the stem for movement therewith, said stem having a portion in said housing provided with means for cooperating with the aperture in said end wall when the stem is moved inwardly to a first position for sealing the housing from the container, said stem also having means for thereafter connecting the housing to the dispensing button to discharge a metered quantity of material from the housing for each operation of the stem, and a bypass means on the stem adjacent and apertured wall adapted to be moved to a bypass position to bypass the sealing relation of said apertured in the wall whereby the container is directly connected to the nozzle for continuously discharging material from the container.

10. Valve means for an aerosol container for dispensing material therefrom, said valve means comprising a reciprocating stem having a normal outward position and provided with a two-part dispensing button thereon, one of said button parts being secured to the stem to reciprocate therewith and the other of said parts being rotatable on the first part, and control means adapted to be secured to the container and cooperating with the button for controlling the dispensing of the material from the container, said control means having means cooperating with the first part of said button to prevent rotation of said part and stem connected thereto during reciprocation thereof, said control means having a control track cooperating with the second part of said button for controlling the inward movement of the stem in response to the rotative position of the second part of the button to hold the stem in the outward position in which the stem is rendered inoperative to dispense material from the device, to locate it in a second position in which the valve means is operative to dispense a metered quantity of material, and to locate it in a third position in which the valve means is operative to continuously dispense said material.

11. A valve means for dispensing material from an aerosol container comprising a housing having an inner end provided with apertured wall adapted to communicate with said container and a seal for the other end of the housing, a reciprocating stem projecting from the container and a dispensing button provided with a nozzle secured thereto for movement therewith, said stem being normally urged to an outward position and provided with means cooperating with the seal to prevent passage of material to said button and having a portion in said housing provided with means for cooperating with the aperture in said end wall when the stem is moved inwardly from said outward position to a first dispensing position for sealing the housing from the container and for connecting the housing to the dispensing button to discharge a metered quantity of material for each operation of the stem, a bypass means on the stem adjacent the apertured wall and adapted to be moved into the aperture in the wall and bypass the sealing relation of said aperture in the wall when the stem is moved to a predetermined second position whereby the material in the container is directly connected to the nozzle for continuously discharging material from the container, and means for selectively controlling the stopping of the valve stem in either of said positions.

References Cited by the Examiner
UNITED STATES PATENTS

| | | | |
|---|---|---|---|
| 1,178,906 | 4/16 | Davis | 222—443 |
| 1,651,731 | 12/27 | Schatz | 222—443 |
| 2,199,947 | 5/40 | Benofsky et al. | 222—443 X |
| 2,702,657 | 2/55 | Davis | 222—443 X |
| 2,706,660 | 4/55 | Johnson et al. | |
| 2,752,066 | 6/56 | Ayres. | |
| 2,772,819 | 12/56 | Poarch et al. | 222—498 X |
| 2,887,273 | 5/59 | Anderson et al. | 239—579 |
| 2,968,427 | 1/61 | Meshberg. | |
| 2,973,123 | 2/61 | Rousset. | |
| 2,997,243 | 8/61 | Kolb | 293—394 X |
| 3,083,872 | 4/63 | Meshberg. | |

RAPHAEL M. LUPO, *Primary Examiner.*

UNITED STATES PATENT OFFICE
CERTIFICATE OF CORRECTION

Patent No. 3,180,536

April 27, 1965

Philip Meshberg

It is hereby certified that error appears in the above numbered patent requiring correction and that the said Letters Patent should read as corrected below.

Column 1, line 14, for "his" read -- this --; column 2, line 59, for "parts" read -- part --; column 3, lines 50 and 51, for "settings" read -- setting --; line 65, for "conatiner" read -- container --; column 6, line 25, for "dispose" read -- dispense --; line 44, for "and" read -- the --; line 46, for "apertured" read -- aperture --; line 73, after "with" insert -- an --; column 8, under "References Cited", line 10, for "Johnson et al." read -- Johnson et al.--------222-394 --; line 11, for "Ayres." read -- Ayres---------222-394 --; line 14, for "Meshberg." read -- Meshberg--------222-394 --; line 15, for "Rousset." read -- Rousset-------222-394 --; line 16, for "293-394 X" read -- 239-394 X --; line 17, for "Meshberg." read -- Meshberg---------239-394 --.

Signed and sealed this 28th day of September 1965.

(SEAL)
Attest:

ERNEST W. SWIDER
Attesting Officer

EDWARD J. BRENNER
Commissioner of Patents